United States Patent [19]

Otake et al.

[11] Patent Number: 4,959,683
[45] Date of Patent: Sep. 25, 1990

[54] PHOTOGRAPHIC PICTURE DISPLAY, APPARATUS AND METHOD OF MAKING ELEMENTAL PRINTS THEREOF

[75] Inventors: Katsumi Otake, Tokyo; Kiichiro Sakamoto, Kanagawa; Mikio Kogane, Tokyo, all of Japan

[73] Assignee: Fuji Photo Film Co., Ltd., Kanagawa, Japan

[21] Appl. No.: 435,131

[22] Filed: Nov. 9, 1989

Related U.S. Application Data

[62] Division of Ser. No. 196,524; May 20, 1980, Pat. No. 4,897,944.

[30] Foreign Application Priority Data

| May 20, 1987 | [JP] | Japan | 62-123053 |
| Jun. 12, 1987 | [JP] | Japan | 62-146654 |
| Jun. 17, 1987 | [JP] | Japan | 62-150810 |

[51] Int. Cl.$^5$ ............ G03B 29/00; G03B 27/44; G03B 27/32
[52] U.S. Cl. .................... 355/28; 40/159; 355/40; 355/54; 355/77
[58] Field of Search ........... 40/159; 355/40, 54, 355/52, 75, 27, 77, 28, 29

[56] References Cited

U.S. PATENT DOCUMENTS

| 3,377,914 | 4/1968 | jeffee | 355/52 X |
| 3,490,844 | 1/1970 | Sapp, Jr. | 355/40 |
| 3,591,284 | 7/1971 | Liebman | 355/75 |
| 3,661,449 | 5/1972 | Wright | 355/54 |
| 3,824,336 | 7/1974 | Gould et al. | 355/52 X |
| 4,078,862 | 3/1978 | Kuwana | 355/40 |
| 4,197,004 | 4/1980 | Hurlbut | 355/54 X |
| 4,247,198 | 1/1981 | Beyrenther | 355/54 |
| 4,506,976 | 3/1985 | Kiejzik | 355/54 |
| 4,704,796 | 11/1987 | Gauer | 355/40 X |
| 4,866,476 | 9/1989 | Kogane et al. | 355/54 X |
| 4,897,944 | 2/1990 | Otake et al. | 40/159 |
| 4,908,657 | 3/1990 | Kogane | 355/54 X |

Primary Examiner—Richard A. Wintercorn
Attorney, Agent, or Firm—Sughrue, Mion, Zinn, Macpeak & Seas

[57] ABSTRACT

A picture display comprising elemental prints having enlarged divisional images with separation arranged in a matrix on a print holder so as to form a single picture, and a printing method and apparatus for making the picture strips as the elemental prints from a single frame of an original film. The printing apparatus has a printing stage movable in two directions perpendicularly intersecting each other so as sequentially to place divisions into which the image frame of the original film is notionally divided in a matrix in printing position for exposing a photographic paper to enlarged divisional images of the divisions in order by column or row, thereby making a picture strip with a row or a column of the enlarged divisional images formed thereon.

11 Claims, 13 Drawing Sheets

PHOTOGRAPHIC PICTURE DISPLAY, APPARATUS AND METHOD OF MAKING ELEMENTAL PRINTS THEREOF

This is a divisional of Application No. 07/196,524, filed May 20, 1988, now U.S. Pat. No. 4,897,944, issued Feb. 6, 1990.

BACKGROUND OF THE INVENTION

The present invention relates to a photographic picture display, apparatus and method of making elemental prints of thee photographic picture display, For displaying large photographic pictures on, for example, a wall, an enlarged print is mounted on a frame holder or attached to a display panel. In order to make large prints, large size photographic paper has heretofore been used to form an image of a frame of a negative film with a considerably large magnification ratio.

A problem associated with making such an enlarged print is that an oversized printer is necessary to print an enlarged image on such large size photographic paper from a standard format original; film, such as negative films, positive films or the like. Therefore, printing costs become higher with printing size or magnification ratio. Another problem is the magnification range of such large prints which depends on the size of photographic papers now commercially available.

OBJECT OF THE INVENTION

It is, therefore, an object of the present invention to provide a large photographic picture display at low cost.

It is another object of the present invention to provide a large size photographic picture display using a number of elemental prints thereby forming a large picture without using large size photographic paper.

It is still another object to provide a method of making elemental prints by which a large picture is formed.

It is a further object of the present invention to provide an apparatus for making elemental prints by which a large picture is formed at a low cost.

SUMMARY OF THE INVENTION

The above and other objects are accomplished by providing a large size photographic picture display which comprises a print holder and a number of elemental prints arranged on the print holder as a single photographic picture. A single image frame of an original film is notionally, i.e. along imaginary lines, into a matrix of smaller divisions. The smaller divisions are enlarged and printed on regular size photographic paper to form such elemental prints. In a preferred embodiment of the present invention, the division of a single frame are printed as a series of enlarged divisional images with separation on regular size photographic paper and then the photographic paper is cut to several picture strips, each of which includes enlarged divisional images of a row or a column of divisions of the image frame of the original film, arranging on the print holder side by side with separation so as to form a large photographic picture. It is preferable to use a flexible print holder which makes a plurality of pockets or open-ended envelopes holding the elemental prints in order to fold in compact.

For providing such a picture strip, the method of the present invention comprises the steps of exposing regular size photographic paper to enlarged images of smaller divisions into which an image frame of an original film is divided in a matrix to form a series of divisional images of the smaller divisions arranged in order of location for each row or column, marking a cut mark between rows or columns of divisional images, processing the exposed photographic paper, and cutting off the photographic paper at a cut mark to thereby provide picture strips each including a row or a column of enlarged divisional images. For embodying the method of making the picture strips according to the present invention, the printer is provided with a film carrier movable in two directions perpendicularly intersecting each other, a controller for controlling the film carrier to move in such a way to place the smaller divisions in a printing position in order of arrangement in column or row, a marker controlled by the controller so as to apply a cut mark to the photographic paper between the rows or columns, and a cutter for cutting the photographic paper to provide picture strips each including divisional images of a row or column of smaller divisions. The film carrier comprises a table movable in first direction and a film holder for holding the original film thereon which is supported and movable in a second direction perpendicular to the first direction on the movable table. By moving the film holder and the stage in different but perpendicularly intersecting directions, any division of an image frame of the original film can be placed in the printing position.

BRIEF DESCRIPTION OF THE DRAWINGS

The above and other objects and features of the present invention will be apparent from the following description taken in conjunction with preferred embodiments thereof with reference to the accompanying drawings, in which.

DETAILED DESCRIPTION OF THE INVENTION

Figure 1A:
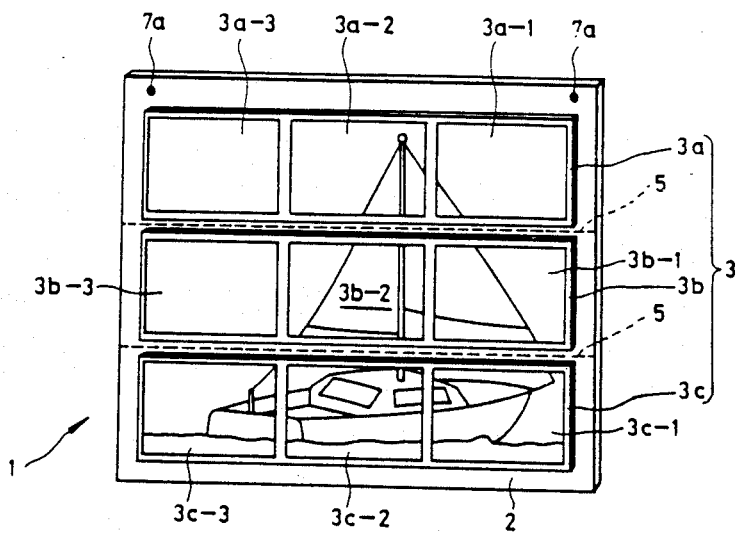
FIG. 1A is a top plan view of a photographic picture display of a embodiment according to the present invention.
Figure 1B:
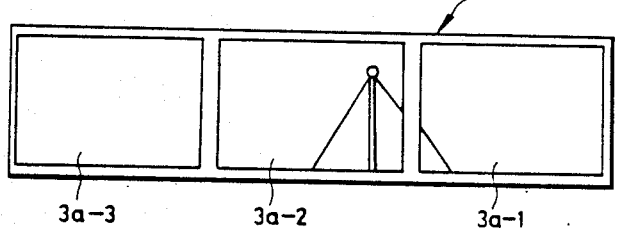
FIG. 1B is a plan view of a picture strip used in the photographic picture display of FIG. 1A.
Figure 1C:
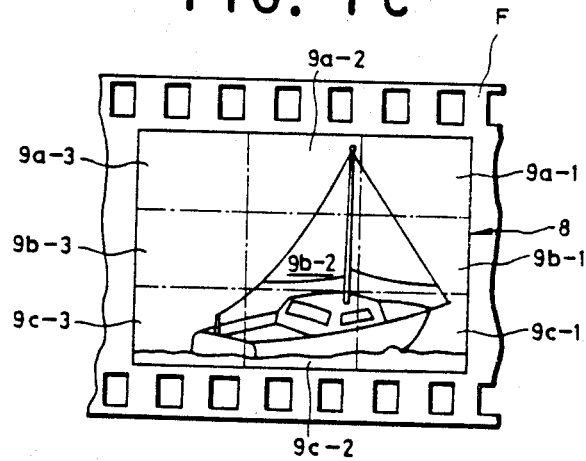
FIG. 1C is a partial plan view of a negative film showing an image frame.

Referring now to FIG. 1A to 1C showing a photographic picture display 1 of a preferred embodiment according to the present invention, the photographic picture display 1 comprises a display panel 2 serving as a print holder and a plurality of enlarged divisional pictures 3 arranged in a 3×3 matrix to form a single picture. Each row of enlarged divisional images is photographically formed on regular size photographic paper; a row being hereinafter referred to as a picture strip; three such strips being shown as 3a, 3b, 3c. Each picture strip 3a, 3b, 3c (one of which is shown in FIG. 1B) includes a plurality of enlarged and separated divisional images, for example divisional images 3a-1 to 3a-3, 3b-1 to 3b-3, and 3c-1 to 3c-3. The picture strips 3a to 3c are arranged side by side and cemented or otherwise adhered with a proper adhesive material to the display panel 2 to display a large single picture that does not cause the observer to have feeling of visual disorder. The display panel 2 may be made of various materials such as plastic plates, aluminum plates, thick cardboards, or the like. For a clear display, the display panel 2 may be either white or suitably colored if the picture strips 3 are made by using photographic paper. Alternatively, if the picture strip 3 is made of a transparent material as base sheet with an emulsion layer coated thereon, the display panel 2 is suitably made of transparent plate. In that case, the picture display 1 would be illuminated from the back by the use of an illumination lamp in any well known manner.

The enlarged divisional images of each picture strip 3 are consecutively formed as regular size. namely E-size (82×114 mm), prints from each row of smaller divisions 9a-1 to 9a-3, 9b-1 to 9b-3, 9c-1 to 9c-3 of a negative film on an image frame 8 (shown in FIG. 1c). It will be appreciated that the smaller division 9a-1, etc. are not physically divided but are only notionally divided, i.e. divided by imaginary lines.

The width of separation provided between the adjacent divisional images and between the picture strips 3 is properly chosen according to pictures to be displayed, viewing distances, etc.

In both upper corners of the display panel 2, there are formed holes 7a through which the picture display 1 is tacked to a wall for display. The display panel 2 is formed with folding lines 5 between the picture strips 3 along which the display panel 2 is folded for storing. The display panel 2 can be made of hard plate or flexible sheet.

Figure 2:
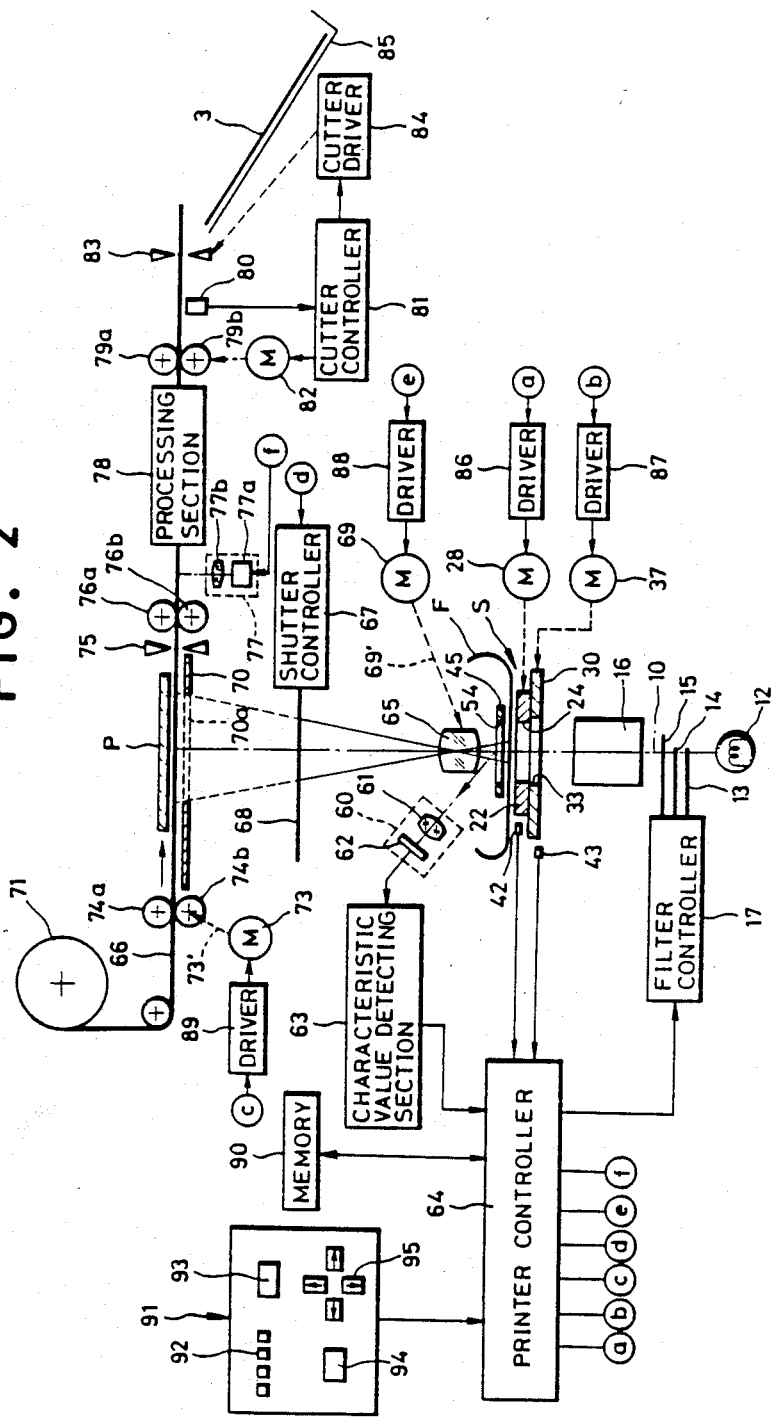
FIG. 2 is a schematic illustration showing a printer for making a picture strip of FIG. 1B according to the present invention.

FIG. 2 shows a printer according to the present invention for making a picture strip with a row of divisional images consecutively formed with separation. As shown, there are three complementary color filters 13, 14 and 15, namely cyan, magenta and yellow, controlled by a filter controller 17. Each color filter 13, 14, 15 is controllably insertable independently of the other two between an illumination lamp 12 for emitting white printing light and a mirror box 16. The mirror box 16, as is well known in the art, comprises a square hollow tube having inner mirrored walls and top and bottom diffusion plates. The white light from the lamp 12 passes through the color filter 13, 14, or 15 into the mirror box 16 and is sufficiently diffused thereby.

The diffused light, passes through a color negative film F, including the image frame 8 shown in FIG. 1C, placed on a film carrier S disposed in a printing optical axis 10, and is focussed on photographic paper 66. The film carrier S comprises a film holder 22 having an exposure opening 24 a slidable table 30 having an exposure opening 33, which is, as will be described in detail later, movably supported by a fixed frame 38 (FIG. 3B) having an opening 44. The film holder 22 and slidable table 30 are moved in directions perpendicularly intersecting each other by pulse motors 28 and 37, which are controllably driven by drivers 87 and 88, respectively. When holder 22 and table 30 are positioned at their initial positions, namely one extremity of their movable range, they can be detected by photosensors 42 and 43, respectively.

Above and at an angle with respect to masking frame 45 and film carrier S is a scanner 60 comprising a lens 61 and an image area sensor 62. The scanner measures the whole area of an image frame of the negative film F to detect light intensities of a large number of picture elements into which the image frame is notionally divided. The light intensity for each picture element is transmitted to an image characteristic value detecting section 63 to provide an image characteristic value such as a large area transmittance density (LATD), a maximum density, a minimum density, a mean density for specified picture elements or the like for each color, which characteristic value in turn is sent to a printer controller 64 mainly comprising a microcomputer well known in the art.

Disposed overhead the film carrier S is a printing or enlarging lens, preferably a zoom lens 65, disposed in the optical path 10 of the illumination light. The lens 65 is operated by a motor 69 through a gear train 69 to change the focal length of the lens. Between the zoom lens 65 and the photographic paper 66 there is a shutter 68 controlled by a shutter controller 67 so as to open for certain time in order to create on photographic paper 66 a latent image of a division of the image frame 8 of the negative film F.

The photographic paper 66 in the form of a roll 71 is withdrawn by means of a pair of feeding rollers 74a and 74b driven by a pulse motor 73 through a gear train 73 and is placed in an exposure station formed by an exposure masking frame 70 defining an exposure aperture 70a for an E size print therein. For holding the photographic paper 66 flat over the exposure masking frame 70, there is a pressure plate P as is well known is the art. Adjacent to the exposure masking frame 70, there is a cutter 75 for cutting off exposed part of the photographic paper 66 after a predetermined number of exposures. Adjacent to the cutter 75, there are a pair of conveyor rollers 76a and 76b and an optical marker 77 comprising an optical mark generator 77a and a lens 77b for forming a latent image of a cut mark 100 (shown in FIG. 6) on the photographic paper 66. The cut mark 100 is used to cut the photographic paper 66 into a divisional picture strip including a predetermined number of divisional images. The exposed part of a photographic paper thus cut is transported into a photographic processor 78 as is well known in the art to be subjected therein to developing, bleaching-fixing and rinsing.

After the photographic processor 78, there is a pair of conveyor rollers 79a and 79b for conveying the photographic paper 66 to another cutter 83 which is associated with a cut mark reader 80 and a cutter driver 84 controlled by a cutter controller 81. The cut mark reader 80 reads the cut mark 100 to provide the cutter controller 81 with a control signal. When a predetermined length of movement of the photographic paper 66 is affected after the provision of the control signal, the cutter controller 81 causes the cutter 83 to cut the photographic paper 66, simultaneously to stop a pulse motor 82 operationally coupled to the conveying rollers 79a and 79b. In such a way, a divisional picture strip 3 shown in FIG. 1B is ejected into a tray 85.

The pulse motors 28, 37, 69 and 73 are controlled in a direction and the number of steps of rotation by the printer controlled 64 through the respective drivers 73 to 79. The filter controller 17m shutter driver 67, and optical marker 77 are also controlled by the printer controller 64 in a programmed sequence.

Connected to the printer controller 64 is an instruction entering device 91 including a division pattern selection key 92 for selecting one of various division patterns or matrix pattern which are previously prepared, a printing key 93 for starting printing, a power switch 94, direction keys 95 for moving the film carrier S. The division pattern selecting key 92 may comprise ten-keys for entering a desired number of rows and columns of a divisional pattern. Further connected to the printer controller 64 is a memory 90 in which is stored data on a program of sequential control of operation for the film carrier S, and automatic printing operation, division patterns and others.

Figure 3A:
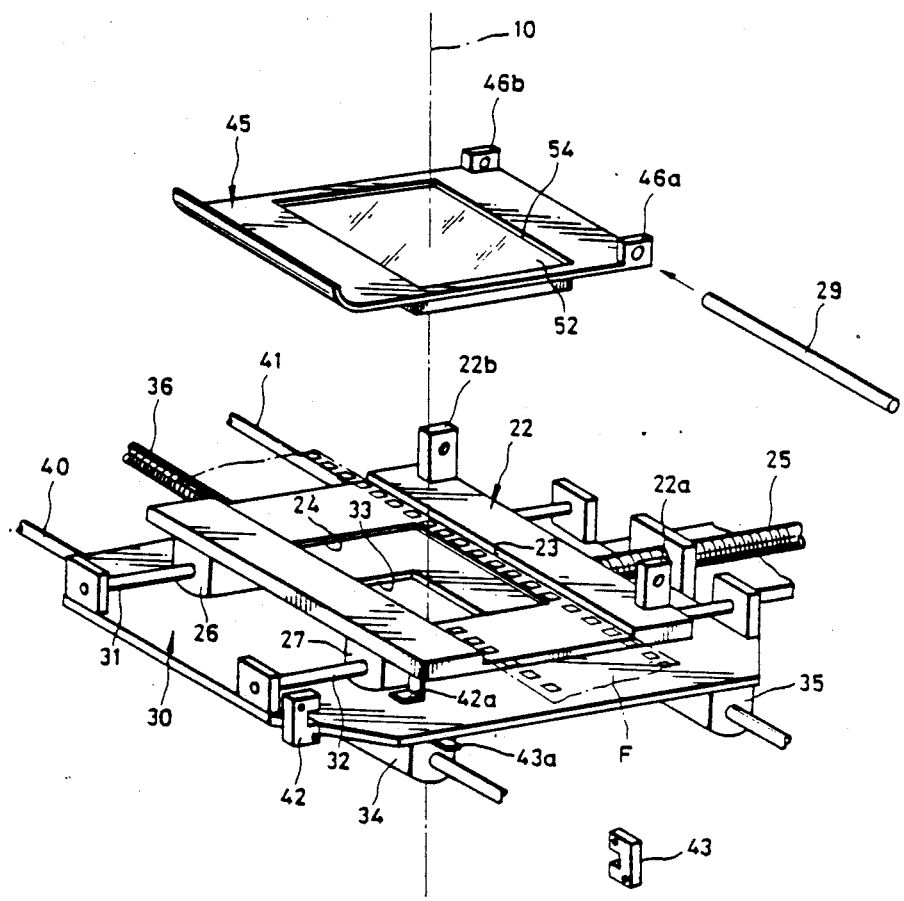
FIG. 3A is an exploded perspective view of a film carrier of the printer of FIG. 2.
Figure 3B:
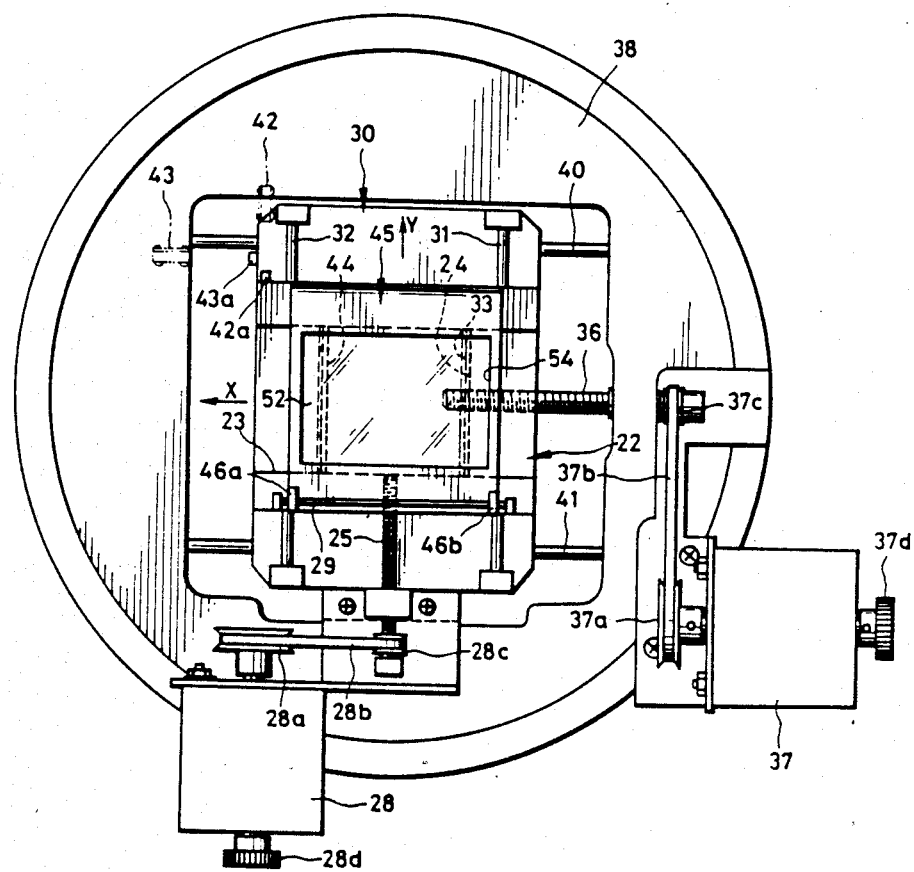
FIG. 3B is a plan view of the film carrier of FIG. 3.

Reference is now had to FIGS. 3A and 3B showing details of the film carrier S. The film holder 22 is formed with a wide groove 23, wherein the negative film F is placed, and a square opening 24 at the middle of the wide groove 23. On one side of the film holder 22 there are brackets 22a and 22b disposed at the opposite corners. The brackets 22a and 22b support a pivot shaft 29 swingably mounting the masking frame 45 through brackets 46a and 46b. One the back of the masking frame 45 a glass plate 52 is attached so as to keep the negative film F flat in the groove 23 of the film holder 22.

Fixed to the back of the film holder 22 are mounting members 26 and 27 for slidably mounting the film holder 22 on the slidable table 30 by means of guide rails 31 and 32 fixed to and extending over the slidable table 30. Due to the guide rails 31 and 32, the film holder 22 is allowed to move back and forth in one direction (which is hereinafter referred to as Y direction). For causing the film holder 22 to move back and forth in the Y direction, a feed screw rod 25 is provided between the film holder 22 and the pulse motor 28 mounted on the slidable table 30. Specifically, the feed screw rod 25 is threadingly engaged at its one end by the mounting holder 23 and has at the opposite end a pulley 28c. Between the pulley 28c and a pulley 28a attached to an output shaft of the pulse motor 28 a driving belt 28b is stretched to operationally couple the pulse motor 28 to the feed screw rod 25, so that the film holder 22 is moved in the Y direction as a result of the rotation of the pulse motor 28.

On the back of the slidable table 30 there are provided mounting members 34 and 35 slidably mounted on guide rails 40 and 41 extending in the direction perpendicular to the Y direction (which is hereinafter referred t as X direction). These guide rails 40 and 41 are supported by a base plate 38 (see FIG. 3B of the printer on which the pulse motor 37 is mounted. The pulse motor 37 has a pulley 37a fixed to an output shaft thereof. By means of a driving belt 37b stretched between the pulley 37a of the motor 37 and a pulley 37c at the end of a feed screw 36 threadingly engaged with the slidable table 30, the slidable table 30 is operationally coupled to the motor 37 so as to be moved back and forth in the X direction. At one end of the guide rails 32 and 40 there are photosensors 42 and 43 which detect light opaque members 42a and 43a attached to the top ends of the film holder 22 and the slidable 30, respectively. Shown at 28d and 37d are knobs attached to rotor shafts of the stepping motors 28 and 37, respectively for adjusting their starting positions. Since the film carrier S is movable in the X and Y directions, perpendicularly intersecting each other, any division 9 of the image frame 8 of the negative film F can be placed in the optical path 10.

Figure 4:
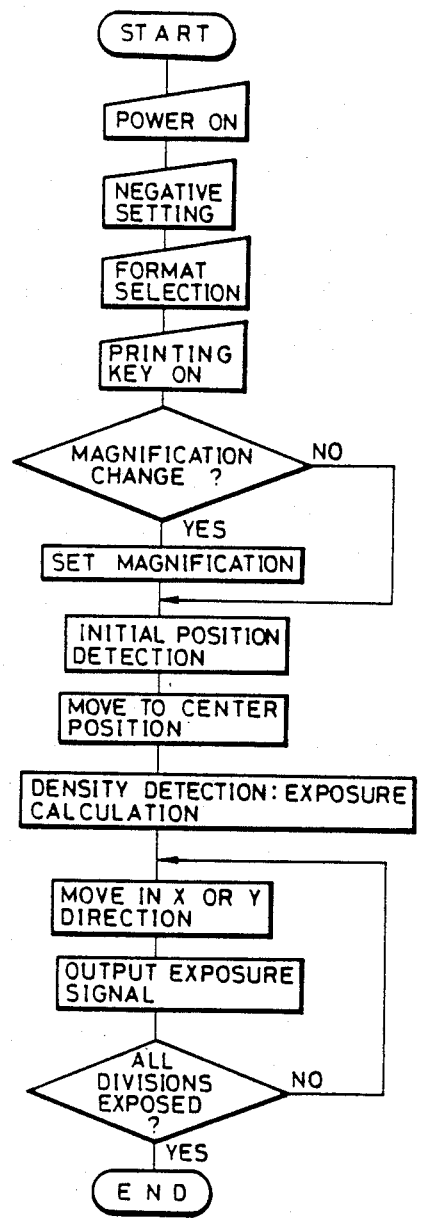
FIG. 4 is a flow chart showing a sequence of operation for making a divisional print.
Figure 5:
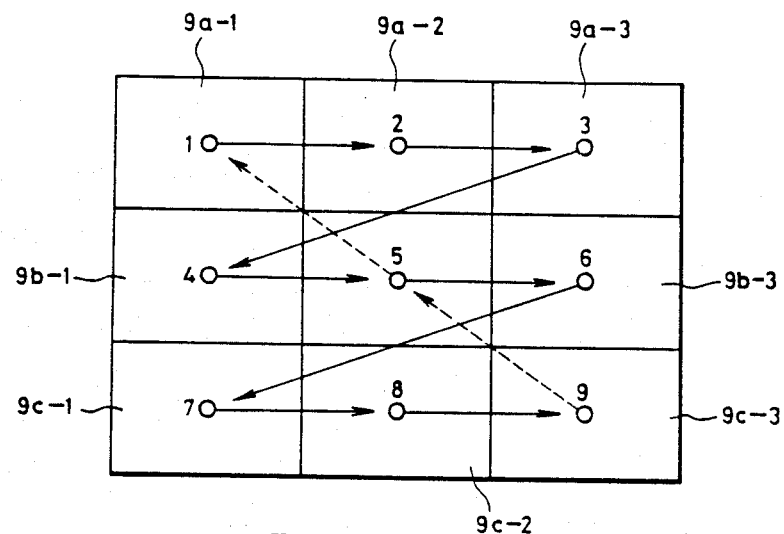
FIG. 5 is an illustration showing a sequence of making nine divisional prints.
Figure 6:
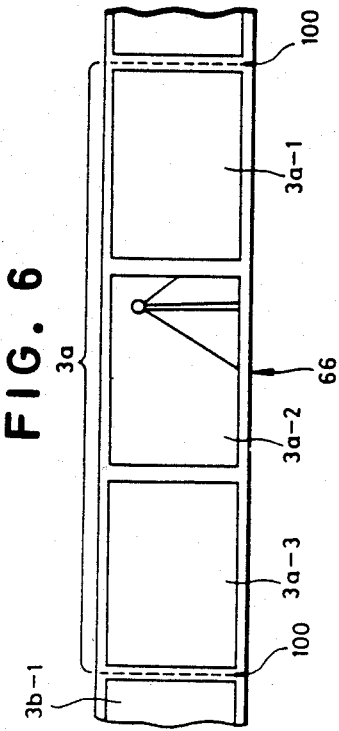
FIG. 6 is an illustration of part of a exposed and processed photographic paper in which a row of divisional prints is formed.

Reference is now had to FIGS. 4 to 6 for explaining printing process of the printer according to the present invention in the case of making divisional picture strip 3 having a row of three divisional images with separation. The first operation is to start the printer by pushing the power switch 94. After placing the image frame 8 of the negative film F in the wide groove 23 of the film holder 22 over the opening 24, the negative film F is held down by the masking frame 45 so as to be kept flat in the wide groove 23 of the film holder 22. Then, the division pattern selection key 92 is operated to select a 3×3 matrix pattern. As as result, according to the instructions for the division pattern entered through the key 92, the printer controller 64 selectively retrieves from the memory 90 a sequential control program by which the film carrier S is sequentially moved and data on magnification at which each division of the image frame 8 of the negative film F is to be printed.

When operating the printing key 93, as the first sequential operation, the printer controller 64 causes the pulse motor 69 to rotate through the driver 88 so as to vary the focal length of the zoom lens 65 in order to fix a magnification desired to make, for example, E size prints.

The printing controller 64 executes the first control of the sequential operation so as to cause the driver 86 and 87 to rotate the pulse motors 28 and 37, moving the film holder 22 in the X direction to the left side extremity as viewed in FIG. 3B and the slidable table 30 in the Y direction to the upper side extremity as viewed also in FIG. 3B. Consequently, the photosensors 42 and 43 are interrupted by the light opaque members 42a and 43a, respectively, to provide stop signals which in turn are sent to the printing controller 64. The printing controller 64, when receiving the stop signals, controls the pulse motors 28 and 37 to stop their rotation so as to locate the film holder 22 and the slidable table 30 at their extreme positions which are referred to as their initial positions, respectively.

As the next sequential control of operation, the printer controller 64 reverses the pulse motors 28 and 37 so as to move back the film holder 22 and the slidable table 30 so as to align the centers of the openings 24 and 33 of the film holder 22 and the slidable table 30, especially the center of the image frame 8 of the negative film F, with the optical axis 10. The position where the film holder 22 and the slidable table 30 place the center of the image frame 8 of the negative film F in the optical axis 10 is referred to as a center position. For moving the film holder 22 and the slidable table 30 to their center positions from their initial positions, the film holder 22 is moved by a distance one third as long as thee length of the image frame 8 of the negative film F the slidable table 30 is moved by a distance one third as long as the width of the image frame 8 of the negative film F.

After having placed the negative film F in the center position, the negative film F is measured by the scanner 60 to detect transmittance densities for red, green and blue. Based on the detected transmittance densities, the image characteristic value detecting section 63 detects characteristic values of the image frame such as a means transmittance density, a maximum density, a minimum density, a mean density of a specified area of the image frame or the like for color which in turn are sent to the controller 64 in order to determine exposures, namely positions of the color filters 13 to 15 in the optical path 10 and a shutter speed of the shutter 68 supplementarily, for the respective colors.

Following the determination of exposures, the controller 64 sequentially controls the pulse motors 28 and 37 so as to move the film holder 22 and the slidable table 30, respectively, in order to bring the center of the first division, 9a-1 of the first row of the image frame 8 of the negative frame F, in alignment with the optical axis 10. Specifically,. the film holder 22 is moved in the Y direction by a distance one third as long as the width of the image frame 8 of the negative frame F and the slidable table 30 is moved in the X direction by the distance one third as long as the length of the image frame 8 of the negative frame F. Then, the printer controller 64 actuates the filter controller 17 to place the color filters at the determined positions independently of each other before the shutter 68 is operated at the determined shutter speed by the shutter controller 67 to form an enlarged latent image of the first division 9a-1 of the image frame 8 of the negative frame F on the photographic paper 66 in a three color sequential exposure which is well known in the art.

After the exposure of the first division 9a-1, the printer controller 64 controls the driver 89 so as to rotate the pulse motor 73 in order to withdraw the photographic paper 66, placing it in the exposure station defined by the exposure masking frame 70. Thereafter, the printer controller 64 controls the driver 87 to rotate the pulse motor 37 so as to move back the slidable table 30 in the X direction by the distance one third as long as the length of the image frame of the negative film F. As a result, the center of the second division 9a-2 of the image frame 8 of the negative film F is brought into alignment with the optical axis 10. The exposure for the second division 9a-2 of the image frame 8 is effected in the same manner as for the first division 9a-1. For the exposure of the third division 9a-3 of the image frame 8e, the slidable table 30 is further moved back by the same distance. It is noted that the film carrier may be moved manually by operating the direction keys 95. In place of the optical marker, it may be permissible to provide a mark printer or a puncher.

After the exposure of the third division 9a-3 of the image frame 8, the printer controller 64 causes the driver 87 to reverse the pulse motor 37 so as to move the slidable table 30 in the X direction a length as long as the image frame 8, while it causes the driver 86 to rotate the pulse motor 28 so as to move back the film holder 22 in the Y direction by one third as long as the width of the image frame 8 of the negative film F, bringing the center of the first division 9b-1 of the second row in alignment with the optical axis 10. For the second and third rows of divisions 9b-1 to 9b-3 and 9c-1 to 9c-3 of the image frame 8 of the negative film F, the operation as for the first row of divisions 9a-1 to 9a-3 is repeated.

When the photographic paper 66 is placed in the exposure station for the exposure of the second division of each row, the optical marker 77 is actuated to form a latent image of the cut mark 100 in the photographic paper between latent images of the third division of the last row and the first division of the row now under exposure as is shown in FIG. 6. Therefore, the cut mark 100 is formed every three consecutive divisional images. In the above described manner, the first to third rows of divisions of the image frame 8 of the negative film F are exposed in numerical order shown by arrow in FIG. 5.

After the completion of exposure of all the divisions 9a-1 to 9c-3 of the image frame 8 of the negative film F, the printer controller 64 controls the driver 86 and 87 to rotate the pulse motors 28 and 37 so as to return the film holder 22 and the slidable table 30 to their center positions. On the other hand, the exposed part of the photographic paper 66 in which the latent images of the three rows of divisions of the image frame 8 of the negative film F have been formed is transported into a photographic processor 78 and stocked in a loop therein. When a predetermined number of exposures are made, the exposed part of the photographic paper 66 is cut off by the cutter 75 and is subjected to several steps of photographic processing.

The processed photographic paper 66 is transported by the rollers 79a and 79b. During the transportation of the photographic paper 66, the cut mark detector 80 detects a cut mark 100 to provide the cutter controller 91 with a control signal. Consequently, the cutter controller 91 stops the pulse motor 82 after a predetermined number of steps of rotation, so as to place the processed photographic paper 66 in such a way to position the cut mark 100 at the cutter 83. Thereafter, the cutter controller 81 actuates the cutter 83 through the driver 84 to cut off the processed photographic paper 66 to provide a divisional picture strip 3 including three divisional images in a row. In such a way, three divisional picture strips 3a to 3c can be prepared for every image frame. These divisional picture strips 3 are arranged side by side on the display panel 2 to form a single picture as is shown in FIG. 1A.

Figure 9:
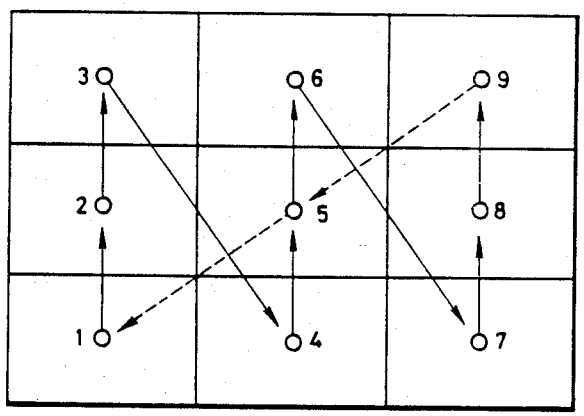
FIG. 9 is an illustration, similar to FIG. 5, showing a sequence of making vertical divisional prints.
Figure 8:
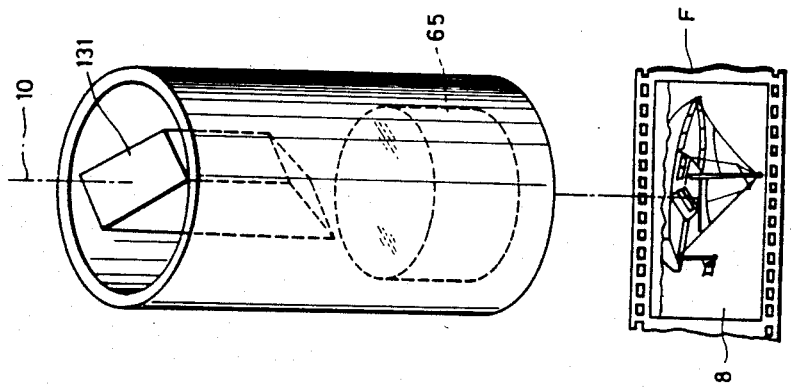
FIG. 8 is an illustration showing a printing lens incorporating a dope prism for turning an image through a right angle.
Figure 7:
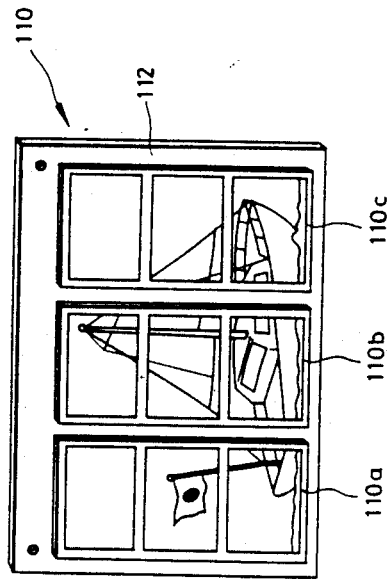
FIG. 7 is a plan view, similar to FIG. 1A of a photographic picture display of another preferred embodiment of the present invention.
Figure 10:
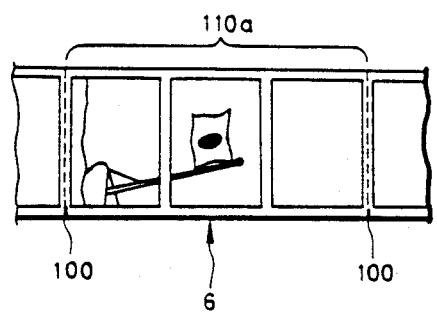
FIG. 10 is an illustration, similar to FIG. 6, of part of an exposed and processed photographic paper in which a column of vertical divisional prints is formed.

Referring to FIG. 7 showing the photographic picture display 110 of another embodiment of the present invention on which are arranged nine divisional images of a single picture. Each column of divisional images is enlarged and printed on a divisional picture strip 110a, 110b, 110c attached to a display panel 112 as a print holder. The divisional picture strip of a column of divisional images can be made using the printer shown in FIG. 2. However, because the direction of each column of divisional images is transversed to the direction in which the photographic paper 66 is translated, an extra dope prism 131, such as shown in FIG. 8, is used in combination with the zoom lens 65. The latter combination forms an image of each division of the image frame F turned through a right angle on the photographic paper 66. A set of divisional picture strips 110a, 110b and 110c (one of which is shown in FIG. 10) are made by consecutively enlarging and printing the individual divisions of the image frame 8 of the negative film F on the photographic paper in numerical order as shown in FIG. 9.

Figure 11:
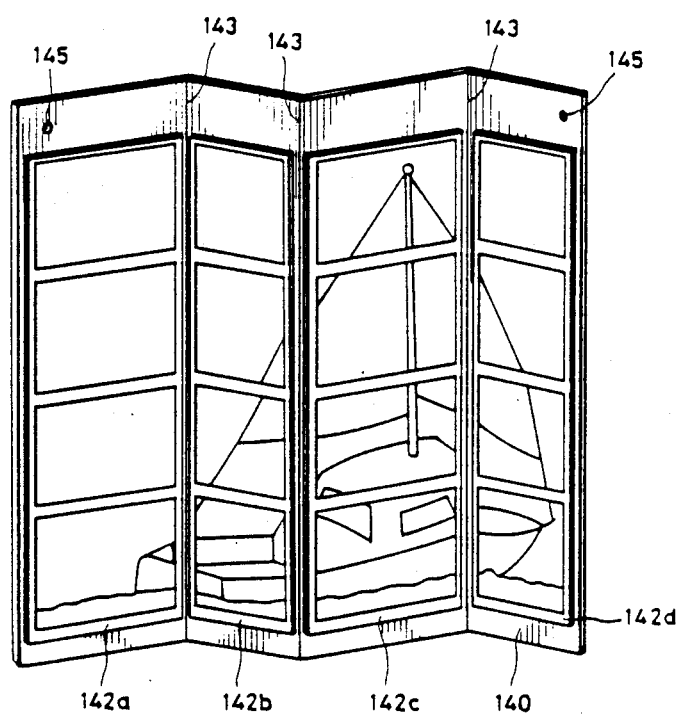
FIG. 11 is a front view showing another example of a photographic picture display.

FIG. 11 shows another form of a photographic picture display. The photographic picture display has a display panel 140 on which a plurality of, for example twelve in this embodiment, divisional images are arranged with separation in a 4×4 matrix. Each column of divisional images is formed as a divisional picture strip 142a, 142b, 142c, 142d similar to those of FIG. 7. Between adjacent picture strips attached to the display panel 140, there is a folding line 143 in the display panel 140. Therefore, this picture display, since the display panel 140 can be folded in the opposite directions alternately, is used in upright as a folding screen. Otherwise, the picture display is tacked to a wall through holes 145 formed in upper corners thereof.

Figure 12:
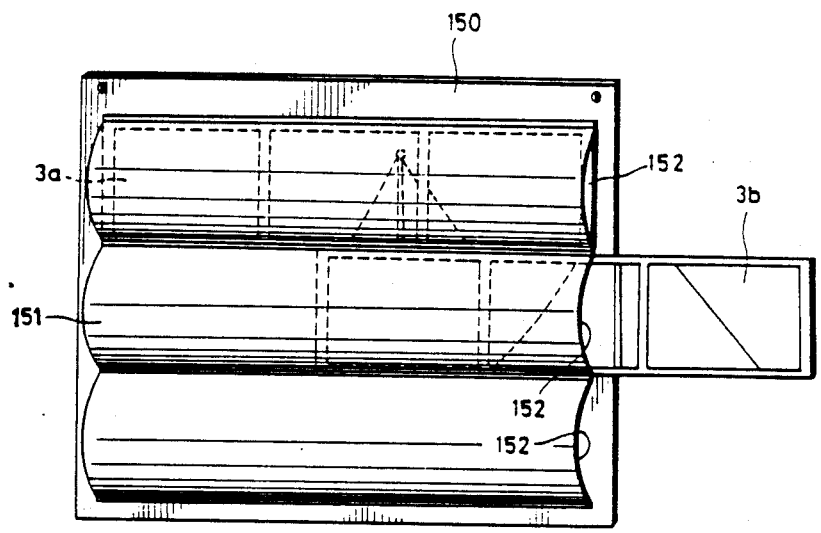
FIG. 12 is a front view showing a preferred form of a print holder.

FIG. 12 shows still another form of a print holder which comprises a transparent sheet 151 and a plate 150. The transparent sheet 151 is cemented or otherwise adhered with a suitable adhesive to the plate 150 along transverse lines so as to form three transparent envelopes 152 for receiving therein divisional picture strips like those of FIG. 1A. Each envelope 152 may be closed at one end. The provision of the transparent envelopes 152 prevents the picture strips from being stained. The plate 150 may take the form of a hard material sheet or a flexible material sheet.

Figure 13:
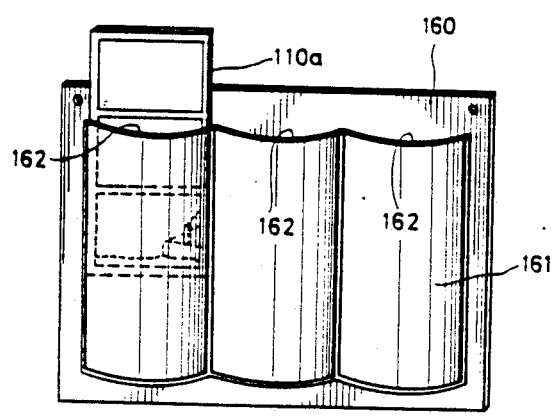
FIG. 13 is a front view showing another preferred form of a print holder.

FIG. 13 shows a further form of a print holder having a plate 160 to which a transparent sheet 161 is cemented or otherwise adhered with a suitable adhere along vertical lines so as to form three transparent envelopes 162 closed at their bottoms. These vertical transparent envelopes 162 receive therein longitudinal divisional picture strips like those of FIG. 7.

Figure 16:
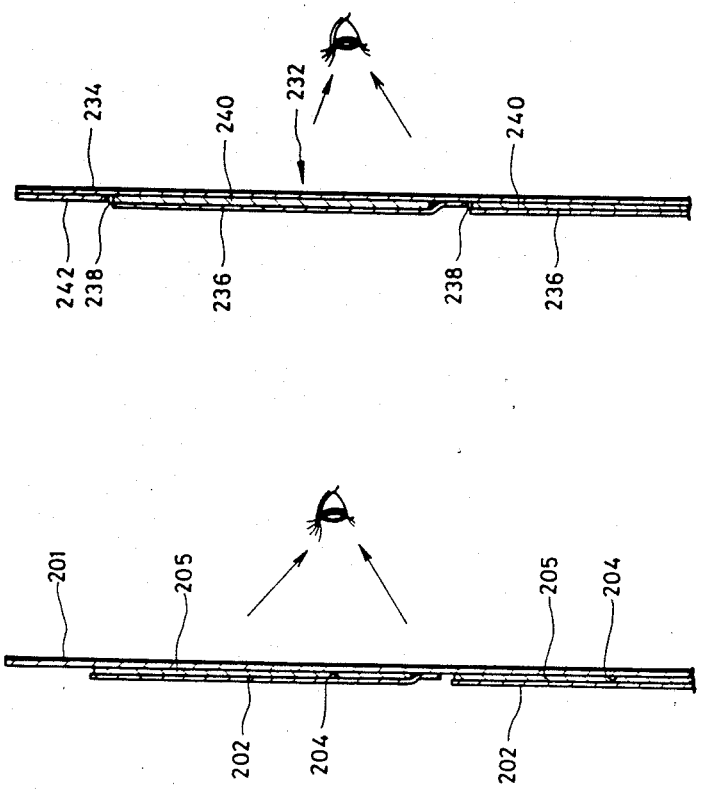
FIG. 16 is a cross sectional view of the photographic picture display of FIG. 14.
Figure 17:
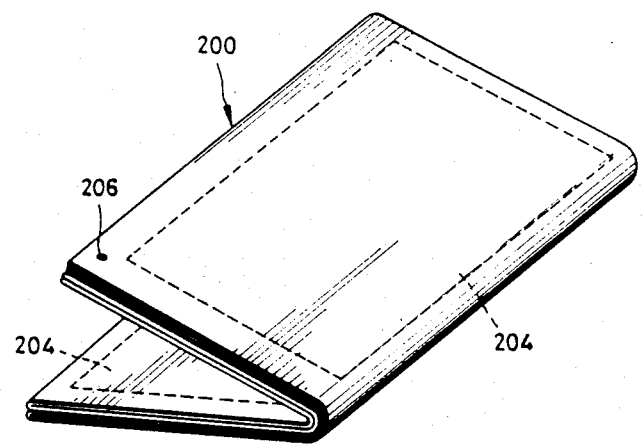
FIG. 17 is an illustration showing the photographic picture display of FIG. 14 in a folded condition.

FIGS. 14 to 17 show a further embodiment of a photographic picture display of the present invention in which a flexible carrier is used as a print holder. The carrier 200 comprises a transparent front sheet 201 of clear plastic film. The front sheet 201 is formed with a plurality of open-ended envelopes or pockets arranged in, for example, a 4×4 matrix with separation for receiving therein enlarged divisional prints of divisions into which an image frame of a negative film is notionally divided in a matrix. An web-like flexible back sheet 202 is adhered together with a suitable adherent or otherwise sealed with heat along lines 203 shaded in FIG. 15 so as to form four open-ended envelopes 204 in a row for receiving therein the enlarged divisional prints 205. Each envelope 204 is surrounded by margins. In such a way, four rows of envelopes 204 are formed on the back of the transparent front sheet 201. Through the end opening, each enlarged divisional print is inserted into the envelope. The picture display is tacked to a wall through holes 206 formed in upper corners thereof for display and is observed as shown in FIG. 16. For storing the picture display, the carrier can be folded with the enlarged divisional prints 205 received therein as is shown in FIG. 17. This carrier is conveniently used to return prints to customers in photofinish laboratories.

Figure 14:
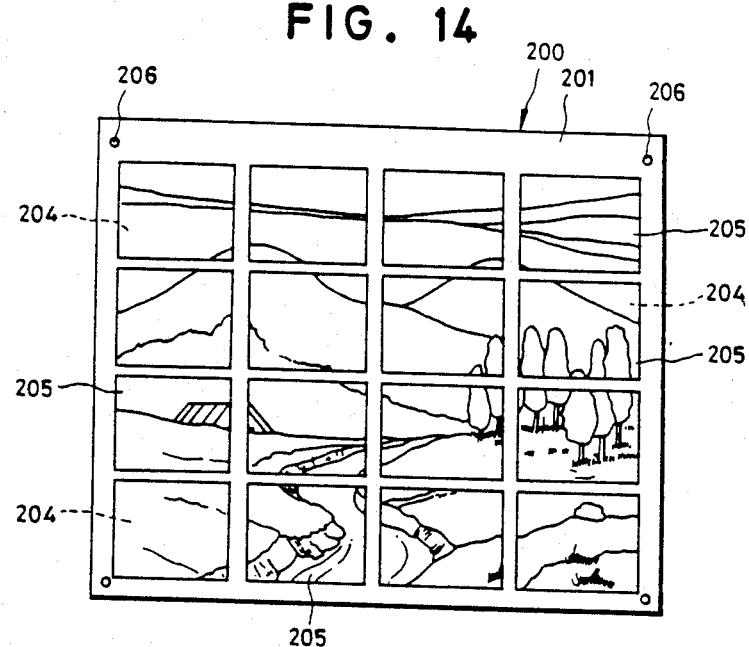
FIG. 14 is a plan view showing the photographic picture display of still another embodiment of the present invention.
Figure 15:
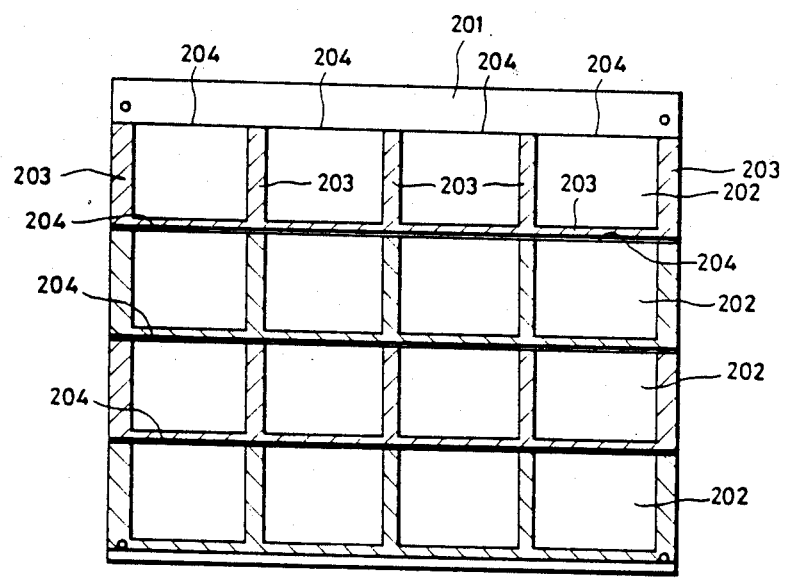
FIG. 15 is an explanatory drawing viewed from the rear side of the photographic picture display of FIG. 14 in order to show an adhesive area attaching each back sheet to a front sheet.
Figure 18:
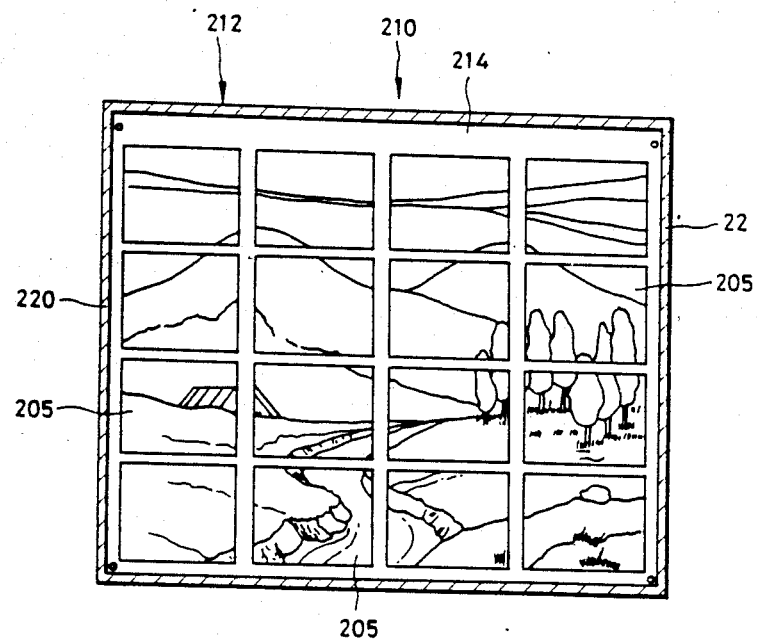
FIG. 18 is a plan view showing the photographic picture display of an embodiment of the present invention which is rimmed with colored stripes.

FIG. 18 shows another form of a foldable photographic picture display 210 similar to that of FIG. 14. A foldable picture carrier 212 of the picture display 210 comprises a flexible front sheet 214 made of a transparent plastic sheet or a relatively thick transparent cellophane film to which a plurality of web-like back sheets are adhered with a suitable adherent or otherwise sealed with heat to form a plurality of open-ended envelopes 218 into which divisional prints are inserted. This front sheet 214 is rimmed With color stripes 220 printed to sheet 214 or attached thereto as colored tapes. Owing to the rimmed front sheet 214, the picture display 210 is well-knitted.

Figure 20:
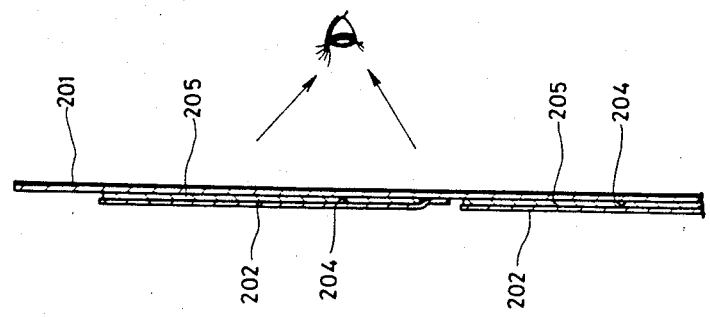
FIG. 20 is a cross sectional view of the photographic picture display of FIG. 19.
Figure 19:
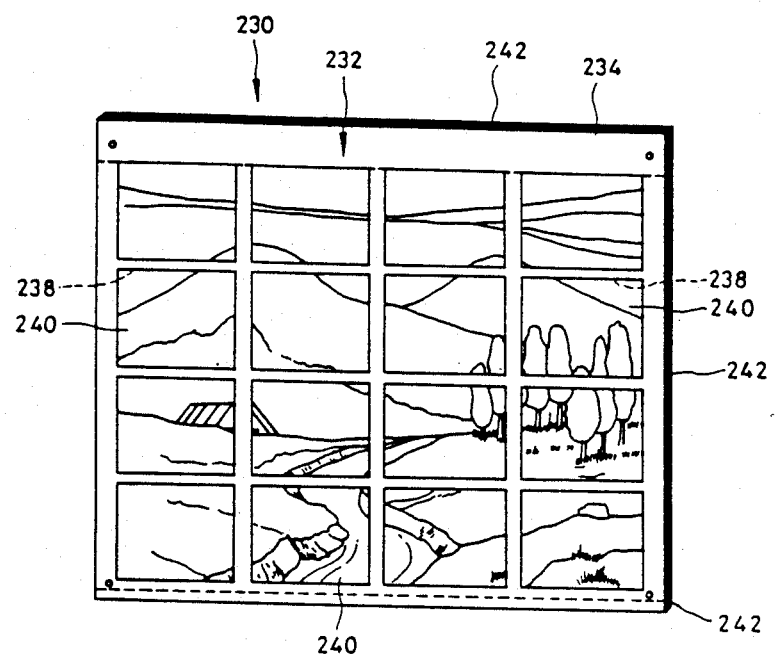
FIG. 19 is a perspective view showing the photographic picture display of another embodiment of the present invention.

FIGS. 19 and 20 show another form of a foldable photographic picture display 230 similar to that of FIG. 18. A foldable picture carrier 232 of the photographic picture display 230 comprises a flexible front sheet 234 made of a transparent plastic sheet or a relatively thick cellophane film to which a plurality of web-like back sheets 236 colored with red or green or any color, are attached in the manner as described above as to the previous embodiment to form a plurality of open-ended envelopes 238 into which divisional prints 240 are inserted. The back surface or the front surface of the front sheet 234 is rimmed with tapes 242 of the same color as the back sheets 236. Owing to the provision of such a front sheet rimmed with colored tapes, the divisional pictures with a colored border are provided and the picture display 230 enables the showing of unconventional interests to viewers. In place of attaching colored tapes to the front sheet, it is permissible to print colored stripes around the front sheet.

Figure 21:
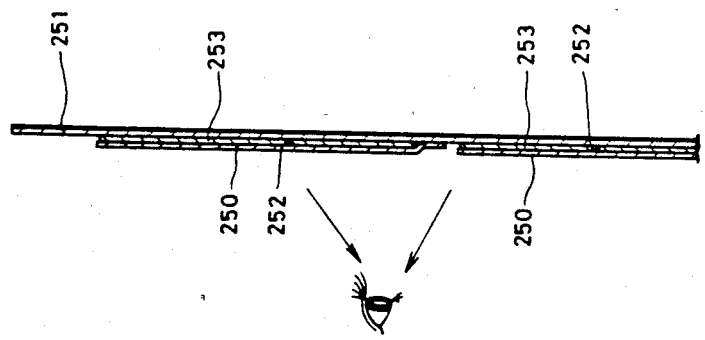
FIG. 21 is a cross sectional view of the embodiment of present invention which is similar to FIG. 14 to FIG. 17.

FIG. 21 shows still another form of a foldable photographic picture display similar to that of FIG. 14 to 17. A plurality flexible transparent front sheets 250 is attached to a front surface of a flexible back sheet 251 which is transparent or colored, so that a plurality of open-ended envelopes 252 is formed into which divisional prints 253 may be inserted.

In any embodiment above described, it is convenient to apply numbers to the elemental prints, namely the divisional strips or divisional prints according to locations on a original picture.

Although the present invention has been fully described by way of various embodiments thereof with reference to the accompanying drawings, it is to be noted that the possibility of changes and modifications will be apparent to those skilled in the art. Therefore, unless such changes and modifications depart from the scope of the present invention, they should be construed as included therein.

What is claimed is:

1. A method of making picture strips arranged on a display panel for forming a single picture, each picture strip including divisional images of a row or a column of smaller divisions of a matrix into which an image frame of a film is notionally divided, said method comprising the steps of:

moving a film carrier in such a way to place said notionally divided smaller divisions in an exposure position;

exposing a photographic paper to enlarged images of said smaller divisions in divided order for each row or column of said matrix;

processing said exposed photographic paper to provide a print of a series of rows or columns of said enlarged divisional images of said smaller divisions; and cutting off said print by row or column to thereby provide picture strips.

2. A method as defined in claim 1, wherein said photographic paper is of regular size.

3. A method as defined in claim 1, wherein said picture strip is formed with a row of divisional images with separation.

4. A method as defined in claim 1, wherein each of said row of enlarged divisional image formed on said picture strip is rimmed with a white margin.

5. A method as defined in claim 1, further comprising the step of applying a cut mark to said photographic paper between said rows or columns.

6. A method as defined in claim 5, wherein said optical mark is optically formed.

7. A photographic printer for making picture strips arranged on a display panel for forming a single picture, each picture strip including enlarged divisional images of a row or a column of smaller divisions of a matrix into which an image frame of a film is notionally divided, said printer comprising:

a film carrier movable in two directions perpendicularly intersecting each other for holding said film thereon.

control means for controlling said film carrier to move in such a way to place said notionally divided smaller divisions in an exposure position in order;

exposure means for exposing a photographic paper to enlarged divisional images of said divisions in order for each row or column;

means for applying a cut mark to said photographic paper between rows or columns; and a cutter for, after processing, cutting said photographic paper at said cut mark to thereby provide said picture strips.

8. A printer as defined in claim 7, wherein said film carrier comprises a table with an opening mounted on said printer for movement in a first direction and a film holder with an opening mounted on said table for movement in a direction perpendicularly intersecting said first direction, said film holder supporting said original film thereon so as to place said single film over said openings.

9. A printer as defined in claim 8, wherein said control means includes means for inputting information on the number of divisions into which said single frame is to be divided, according to said information said control means selecting a sequential control program suitable for divisionally positioning said single frame of said film in said exposure position.

10. A printer as defined in claim 7, wherein said marking means applies an optical mark to said photographic paper.

11. A printer as defined in claim 7, wherein said photographic paper is of regular size.

* * * * *